(12) United States Patent
Ruan et al.

(10) Patent No.: US 11,479,263 B2
(45) Date of Patent: Oct. 25, 2022

(54) AUTOMOTIVE NETWORK SWITCH WITH ANOMALY DETECTION

(71) Applicant: MARVELL ASIA PTE, LTD., Singapore (SG)

(72) Inventors: Xiaofan Ruan, Singapore (SG); Yee-Seng Yeo, Singapore (SG)

(73) Assignee: MARVELL ASIA PTE LTD, Singapore (SG)

( * ) Notice: Subject to any disclaimer, the term of this patent is extended or adjusted under 35 U.S.C. 154(b) by 260 days.

(21) Appl. No.: 16/910,157

(22) Filed: Jun. 24, 2020

(65) Prior Publication Data

US 2020/0406910 A1 Dec. 31, 2020

Related U.S. Application Data

(60) Provisional application No. 62/866,285, filed on Jun. 25, 2019.

(51) Int. Cl.

| | |
|---|---|
| *H04L 43/0829* | (2022.01) |
| *B60W 50/04* | (2006.01) |
| *G06N 20/00* | (2019.01) |
| *G06N 5/04* | (2006.01) |
| *H04L 43/0852* | (2022.01) |
| *H04L 69/22* | (2022.01) |

(52) U.S. Cl.
CPC ............ *B60W 50/045* (2013.01); *G06N 5/04* (2013.01); *G06N 20/00* (2019.01); *H04L 43/0829* (2013.01); *H04L 43/0852* (2013.01); *H04L 69/22* (2013.01)

(58) Field of Classification Search
CPC ....... B60W 50/045; G06N 5/04; G06N 20/00; H04L 43/0829; H04L 43/0852; H04L 69/22; H04L 41/147; H04L 41/142; H04L 41/16; H04L 43/062; H04L 43/08

See application file for complete search history.

(56) References Cited

U.S. PATENT DOCUMENTS

| | | |
|---|---|---|
| 2008/0236269 A1 | 10/2008 | Howell et al. |
| 2016/0269225 A1 | 9/2016 | Kirchmeier et al. |
| 2018/0019931 A1* | 1/2018 | Jalan ..................... H04L 43/106 |

(Continued)

OTHER PUBLICATIONS

International Application # PCT/IB2020/055969 Search Report dated Oct. 9, 2020.

(Continued)

*Primary Examiner* — Kibrom T Hailu

(57) ABSTRACT

An automotive network switch includes multiple ports, a switch core and one or more processors. The ports are configured to receive packets from electronic subsystems of a vehicle over a computer network deployed in the vehicle, and to transmit the packets to other electronic subsystems of the vehicle over the computer network. The switch core is configured to receive the packets from one or more of the ports, to forward the packets to at least one of the ports, and to transmit the packets over network links of the computer network. The processors are configured to obtain at least some of the packets processed by the switch, to analyze the obtained packets to identify an anomaly in one or more of the electronic subsystems of the vehicle, and to send a notification of the anomaly over the computer network to a central processor that is external to the switch.

20 Claims, 2 Drawing Sheets

(56) References Cited

U.S. PATENT DOCUMENTS

| | | | | |
|---|---|---|---|---|
| 2018/0315398 | A1* | 11/2018 | Kaul | G09G 5/393 |
| 2019/0079842 | A1 | 3/2019 | Chae et al. | |
| 2020/0092158 | A1* | 3/2020 | Weber | H04L 1/004 |
| 2020/0220888 | A1* | 7/2020 | Terazawa | H04L 12/40169 |
| 2020/0304532 | A1* | 9/2020 | Haga | H04L 12/40 |

OTHER PUBLICATIONS

Bellamy III, "Boeing CEO Sees Future Growth in Data Analytics, Aircraft Services", Aviation Today, pp. 1-5, Jan. 27, 2017 downloaded from https://www.aviationtoday.com/2017/01/27/boeing-ceo-sees-future-growth-in-data-analytics-aircraftservices.

Bertoncello et al., "Monetizing Car Data", McKinsey & Company, Advanced Industries, pp. 1-60, Sep. 2016 downloaded from https://www.mckinsey.com/industries/automotive-and-assembly/ourinsights/monetizing-car-data.

"BMW CarData: a sign of things to come for all OEMs", Ptolemus, Munich, Germany, pp. 1-6, Nov. 29, 2017 downloaded from https://www.ptolemus.com/blog/bmw-cardata-asign-of-things-to-come-for-all-oems/.

Prytz, "Machine Learning Methods for Vehicle Predictive Maintenance Using Off-Board And On-Board Data", Licentiate Thesis, Halmstad University, pp. 1-96, year 2014.

Shafi et al., "Vehicle Remote Health Monitoring and Prognostic Maintenance System", Hindawi—Journal of Advanced Transportation, vol. 2018, article ID 8061514, pp. 1-11, Jan. 18, 2018.

Wong et al., "Power system fault prediction using artificial neural networks", Progress in Neural Information Processing, Springer, London, UK, pp. 1181-1186, year 1996.

Farokhazad et al., "Artificial Neural Network Based Classification of Faults in Centrifugal Water Pump", Journal of Vibroengineering, vol. 14, issue 4, pp. 1734-1744, Dec. 4, 2012.

"IEEE Standard for Ethernet—Amendment 1: Physical Layer Specifications and Management Parameters for 100 Mb/s Operation over a Single Balanced Twisted Pair Cable (100BASE-T1)", The Institute of Electrical and Electronics Engineers, Inc., New York, pp. 1-88, year 2015.

\* cited by examiner

AUTOMOTIVE NETWORK SWITCH WITH ANOMALY DETECTION

CROSS-REFERENCE TO RELATED APPLICATIONS

This application claims the benefit of U.S. Provisional Patent Application 62/866,285, filed Jun. 25, 2019, whose disclosure is incorporated herein by reference.

FIELD OF THE DISCLOSURE

The present disclosure relates generally to communication systems, and particularly to methods and systems for anomaly detection in network switches.

BACKGROUND

Various applications, such as automotive in-car communication systems, certain industrial communication systems and smart-home systems, require communication at high data rates over relatively small distances. Several types of protocols and communication media have been proposed for such applications. For example, Ethernet communication over twisted-pair copper wire media is specified in "IEEE 802.3bw-2015—IEEE Standard for Ethernet Amendment 1: Physical Layer Specifications and Management Parameters for 100 Mb/s Operation over a Single Balanced Twisted Pair Cable (100BASE-T1)," March, 2015.

The description above is presented as a general overview of related art in this field and should not be construed as an admission that any of the information it contains constitutes prior art against the present patent application.

SUMMARY

An embodiment that is described herein provides an automotive network switch including a plurality of ports, a switch core and one or more processors. The ports are configured to receive packets from electronic subsystems of a vehicle over a computer network deployed in the vehicle, and to transmit the packets to other electronic subsystems of the vehicle over the computer network. The switch core is configured to receive the packets from one or more of the ports, to forward the packets to at least one of the ports, and to transmit the packets over network links of the computer network. The one or more processors are configured to obtain at least some of the packets processed by the switch, to analyze the obtained packets to identify an anomaly in one or more of the electronic subsystems of the vehicle, and to send a notification of the anomaly over the computer network to a central processor that is external to the switch.

In an embodiment, the one or more processors are configured to generate a health score that quantifies a severity of the anomaly, and to report the health score in the notification. In an example embodiment, in analyzing the obtained packets, the one or more processors are configured to identify an existing anomaly or to predict an imminent anomaly. In a disclosed embodiment, at least one of the electronic subsystem includes a sensor, the ports are configured to receive at least some of the packets from the sensor, and the one or more processors are configured to identify an abnormal functioning of the sensor.

In some embodiments, the one or more processors are configured to identify the anomaly in response to detecting a statistically-deviant pattern of attributes of the packets. In various embodiments, the statistically-deviant pattern includes one or more of a statistically-deviant dropping of packets, a statistically-deviant packet rate, a statistically-deviant latency, and a statistically-deviant inter-packet spacing.

In some embodiments, the one or more processors are configured to run a Machine-Learning model configured to detect the anomaly. In an embodiment, the one or more processors are configured to count events relating to the packets, and to detect the anomaly based on the counted events. In a disclosed embodiment, at least one of the one or more processors includes a Machine-Learning (ML) accelerator that is separate from a switch Central Processing Unit (CPU) or switch Graphics Processing Unit (GPU) disposed in the switch.

In some embodiments, the one or more processors are configured to select one or more packet streams from among the packets processed by the switch, in accordance with a predefined selection criterion, and to identify the anomaly by analyzing the packets in the selected packet streams. In example embodiment, the one or more processors are configured to select the one or more packet streams by performing on one or more of (i) examining one or more header fields of one or more of the packets, and (ii) applying Deep Packet Inspection (DPI) to one or more of the packets.

There is additionally provided, in accordance with an embodiment that is described herein, a method for anomaly detection in a vehicle. The method includes, in an automotive network switch in the vehicle, receiving packets from electronic subsystems of the vehicle over a computer network deployed in the vehicle, and transmitting the packets to other electronic subsystems of the vehicle over the computer network. At least some of the packets processed by the switch are analyzed, by the switch, to identify an anomaly in one or more of the electronic subsystems of the vehicle. A notification of the anomaly is sent from the switch over the computer network to a central processor that is external to the switch.

The present disclosure will be more fully understood from the following detailed description of the embodiments thereof, taken together with the drawings in which:

DETAILED DESCRIPTION OF EMBODIMENTS

Figure 1:
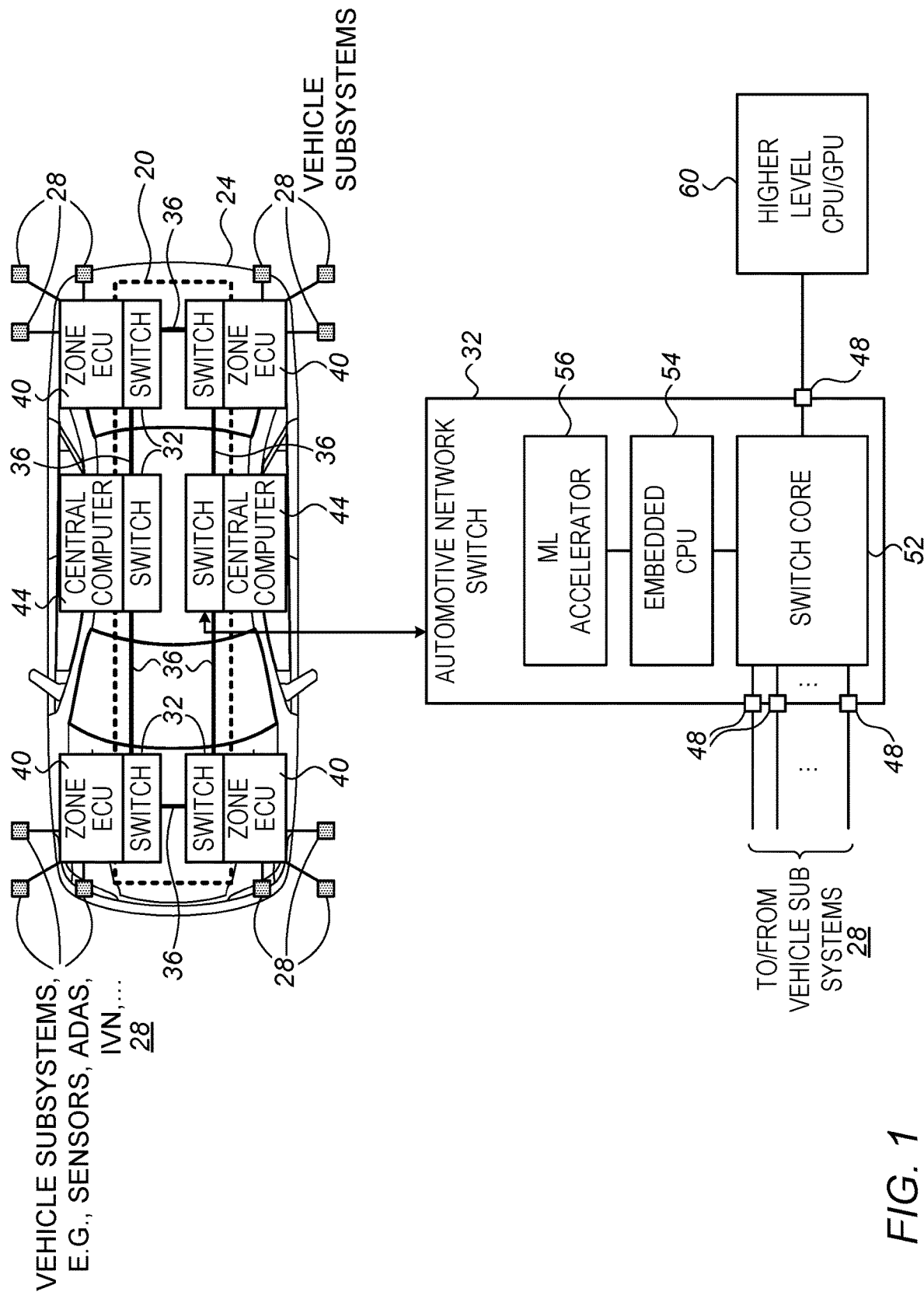
FIG. 1 is a block diagram that schematically illustrates an automotive communication system, in accordance with an embodiment that is described herein.

Embodiments that are described herein provide improved methods and systems for status monitoring, for use in electronic systems comprising subsystems that exchange communication packets with one another. The disclosed techniques identify existing or imminent faults in electronic subsystems by detecting anomalies in the packets.

The embodiments disclosed herein are described in the context of automotive applications, e.g., systems that collect data from sensors or otherwise communicate data within a vehicle. This choice, however, is made solely for the sake of clarity. The disclosed techniques are equally applicable in other applications, for example in industrial and/or smart-home networks.

In some disclosed embodiments, a vehicle comprises multiple electronic subsystems, such as sensors, various types of Electronic Control Units (ECUs), Advanced Driver Assistance Systems (ADASs), In-Vehicle Infotainment (IVN) systems, a main central computer, and the like. The electronic subsystems communicate over a computer network, e.g., an Ethernet network. The network comprises multiple network switches that communicate with one another and with the various subsystems over network links, e.g., twisted-pair copper links.

In many practical scenarios, it is possible to identify an existing or imminent fault in an electronic subsystem by detecting an anomaly in network packets that are transmitted or received over a network link. For example, a faulty sensor may be identified by detecting an excessive rate of dropped packets or a statistically-deviant packet rate.

In some embodiments described herein, the task of detecting anomalies in the communication traffic is delegated to one or more of the network switches in the network. Typically, although not necessarily, anomaly detection is distributed among a plurality of the network switches.

In an example embodiment, a network switch comprises, among other components, one or more processors that are configured to analyze at least some of the packets processed by the switch, and to identify an anomaly in one or more of the electronic subsystems of the vehicle based on the analyzed packets. Upon identifying an anomaly, for example by statistical analysis of network traffic, the processor or processors are configured to send a notification of the anomaly, over the network, to a central processor that is external to the switch. The notification may comprise, for example, a "health score" that quantifies the severity of the anomaly. The central processor is configured to receive health scores from the various network switches, and to take suitable actions responsively to the health scores.

In one non-limiting embodiment, each network switch comprises an embedded CPU and a Machine-Learning (ML) accelerator. The embedded CPU receives selected packet streams that are processed by the switch, performs certain preparation on the packet streams, and sends the packet streams to the ML accelerator. The ML accelerator runs a suitable ML inference model that identifies faults in subsystems by analyzing the packet streams.

The ML inference model may be trained, for example, to detect statistically-deviant patterns of the packets suitably based on, for instance, one or more packets that are corrupted in some manner, that deviate from predetermined policy rules, that are dropped, that are not dropped despite being corrupted in some manner and the like. In some models, absolute quantities of packets are considered, while in other models a rate and/or percentages of packets exhibiting different characteristics are considered. In some models, one or more characteristic signatures, for instance as may be seen in a scatter diagram defined by a plot of two or more packet characteristics, is generated and then analyzed to determine the presence of an anomaly.

Analyzing packet streams and identifying anomalies at the network switches is highly effective for several reasons. First of all, the network switches are located "at the network edge"—close to the sensors or other subsystems being monitored. Moreover, the disclosed solution enables distribution of the analysis task among multiple switches, thereby offloading the central computer and simplifying the operation of each individual switch. The disclosed distributed solution integrates naturally with the architecture of modern automotive systems, in which the vehicle is divided into zones that are served by different "Zone ECUs" and different switches.

FIG. 1 is a block diagram that schematically illustrates an automotive communication system deployed in a vehicle 24, in accordance with an embodiment that is described herein.

Vehicle 24 comprises multiple electronic subsystems 28 of various kinds. Some of the subsystems 28 comprise sensors, such as, for example, video cameras, velocity sensors, accelerometers, audio sensors, infra-red sensors, radar sensors, lidar sensors, ultrasonic sensors, rangefinders or other proximity sensors, and/or any other suitable type of sensors. Other subsystems 28 comprise, for example, Advanced Driver Assistance Systems (ADASs) and/or In-Vehicle Infotainment (IVN) systems. Yet other subsystems 28 comprise Electronic Control Units (ECUs) that control vehicle elements such as engine, body, steering and the like. Additionally or alternatively, vehicle 24 may comprise any other suitable types of electronic subsystems 28.

In some embodiments, vehicle 24 is divided into multiple zones, and subsystems 28 of each zone are controlled by a respective "Zone ECU" 40. The various zone ECUs 40 communicate with a central computer 44 of vehicle 24.

Electronic subsystems 28, ECUs 40 and central computer 44 communicate with one another by sending and receiving communication packets over a computer network 20. In the present example, network 20 operates in accordance with one of the IEEE 802.3 Ethernet standards, e.g., the IEEE 802.3bw-2015, cited above. Network 20 comprises multiple automotive network switches 32, in the present example Ethernet switches. Communication among switches 32, between switches 32 and ECUs 40, and between ECUs 40 and subsystems 28, is carried out over network links 36. Depending on the applicable Ethernet standard, links 36 may comprise any suitable physical medium, e.g., twisted-pair copper links, optical links, waveguides and the like.

An inset at the bottom of FIG. 1 illustrates the internal structure of an example switch 32, in an embodiment. In some embodiments all switches 32 of network 20 have a similar internal structure. In other embodiments, only a subset of switches 32, possibly only a single switch 32, will have this structure.

In the present example, switch 32 comprises a plurality of ports 48, a switch core 52, an embedded CPU 54 and a Machine-Learning (ML) accelerator 56. Ports 48 are connected to respective links 36 that connect switch 32 to subsystem 28, to other switches 32 and/or to a higher-level computer 60 (e.g., a CPU or GPU), such as a zone ECU 40 or central computer 44. Thus, ports 48 are configured to transmit and receive packets over network 20, to and from other system components. Switch core 52 is configured to forward packets among the ports, so as to transmit each received packet to its proper destination. Embedded CPU 54 is configured to configure and control the operation of switch 32. Embedded CPU 54 may comprise, for example, an ARM processor or other suitable processor.

The configurations of the system of FIG. 1 and its elements, such the internal structure of network switches 32, as shown in FIG. 1, are example configurations that are depicted solely for the sake of clarity. In alternative embodiments, any other suitable configurations can be used. For example, network 20 may comprise any suitable number of switches 32, possibly a single switch 32, and have any other suitable interconnection topology. The numbers and types of subsystems 28 and ECUs 40 in vehicle 24 may also vary.

Elements that are not mandatory for understanding of the disclosed techniques have been omitted from the figure for the sake of clarity.

The different elements of the system of FIG. 1 and its various components may be implemented using dedicated hardware or firmware, such as using hard-wired or programmable logic, e.g., in an Application-Specific Integrated Circuit (ASIC) or Field-Programmable Gate Array (FPGA). In some embodiments, for example, an entire automotive network switch 32 is implemented in a System-on-Chip (SoC). Additionally or alternatively, some functions, e.g., functions of embedded CPU 54 and/or ML accelerator 56, may be implemented in software and/or using a combination of hardware and software elements.

In some embodiments, CPU 54 and/or ML accelerator 56 comprise programmable processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

In some embodiments, embedded CPU 54 and ML accelerator 56 are configured to analyze at least some of the packets that are processed by switch 32. By analyzing the packets, embedded CPU 54 and ML accelerator 56 identify anomalies that are indicative of existing or imminent faults in the subsystems of vehicle 24.

It is noted that although the embodiments described herein refer to a certain "division of labor" between embedded CPU 54 and ML accelerator 56, this partitioning is by no means mandatory. In alternative embodiments, packet analysis and anomaly detection may be partitioned between embedded CPU 54 and ML accelerator 56 in any other suitable way. Further alternatively, packet analysis and anomaly detection may be performed by any other suitable configuration of one or more processors. For example, in some embodiments packet analysis and anomaly detection are performed, for example when using relatively simple inference models, solely by embedded CPU 54, and ML accelerator is omitted.

In the present context, the term "anomaly in the packets" refers to a deviation from a baseline in any pattern, attribute, content and/or other one or more properties of packets or packet streams. Some example anomalies comprise a statistically-deviant pattern in one or more attributes of packets originating from a certain subsystem 28, such as, for example:

Statistically-deviant dropping of packets, e.g., a percentage of dropped packets that exceeds a certain threshold percentage or that deviates by more than a certain threshold percentage from an expected baseline dropping rate.

A statistically-deviant packet rate, e.g., a packet rate that drops below a certain threshold rate or deviates by more than a certain threshold percentage from an expected baseline rate.

A statistically-deviant packet latency, e.g., a latency that exceeds a certain threshold latency or deviates by more than a certain threshold percentage from an expected baseline latency.

A statistically-deviant inter-packet spacing, e.g., a spacing that exceeds a certain threshold spacing or deviates by more than a certain threshold percentage from an expected baseline inter-packet spacing.

In alternative embodiments, embedded CPU 54 and ML accelerator 56 may identify any other suitable anomaly in the packets processed by switch 32, which might be indicative of an existing or imminent fault.

In a typical embodiment, embedded CPU 54 and ML accelerator 56 monitor and establish the expected baseline packet statistics (e.g., packet rates per source subsystem, packet drop rate per source subsystem or per port, etc.). This baseline is subsequently used for identifying deviations.

In various embodiments, embedded CPU 54 and ML accelerator 56 detect various kinds of anomalies, which may be indicative of various existing or imminent faults. For example, a sensor may become dirty, a sensor may become unplugged or a connector may loosen over time, the vehicle may pass through a region of unexpected sustained electromagnetic interference (for example an extreme electrical storm), or an engine problem may result in interference that affects packets. Some faults are "hard failures" such as total failure of a sensor. Other faults, such as a dirty camera or a slightly loose connector, are "soft", meaning they exhibit some degradation in performance that corresponds to a noticeable change in the packets, but not a catastrophic failure.

In some embodiments, a "soft" fault develops over time and becomes increasingly severe, and this development is detected by embedded CPU 54 and/or ML accelerator 56 by analyzing packets. For example, a trend of increasing latency, a trend of decreasing throughput and/or a trend of increasing packet drops may be indicative of a developing fault.

In some embodiments, embedded CPU 54 counts various packet-related events using suitable counters. Typically, although not necessarily, the counters accumulate the events separately per port 48. Embedded controller 54 and/or ML accelerator 56 may use the counted events for detecting anomalies.

Figures 2, 3:
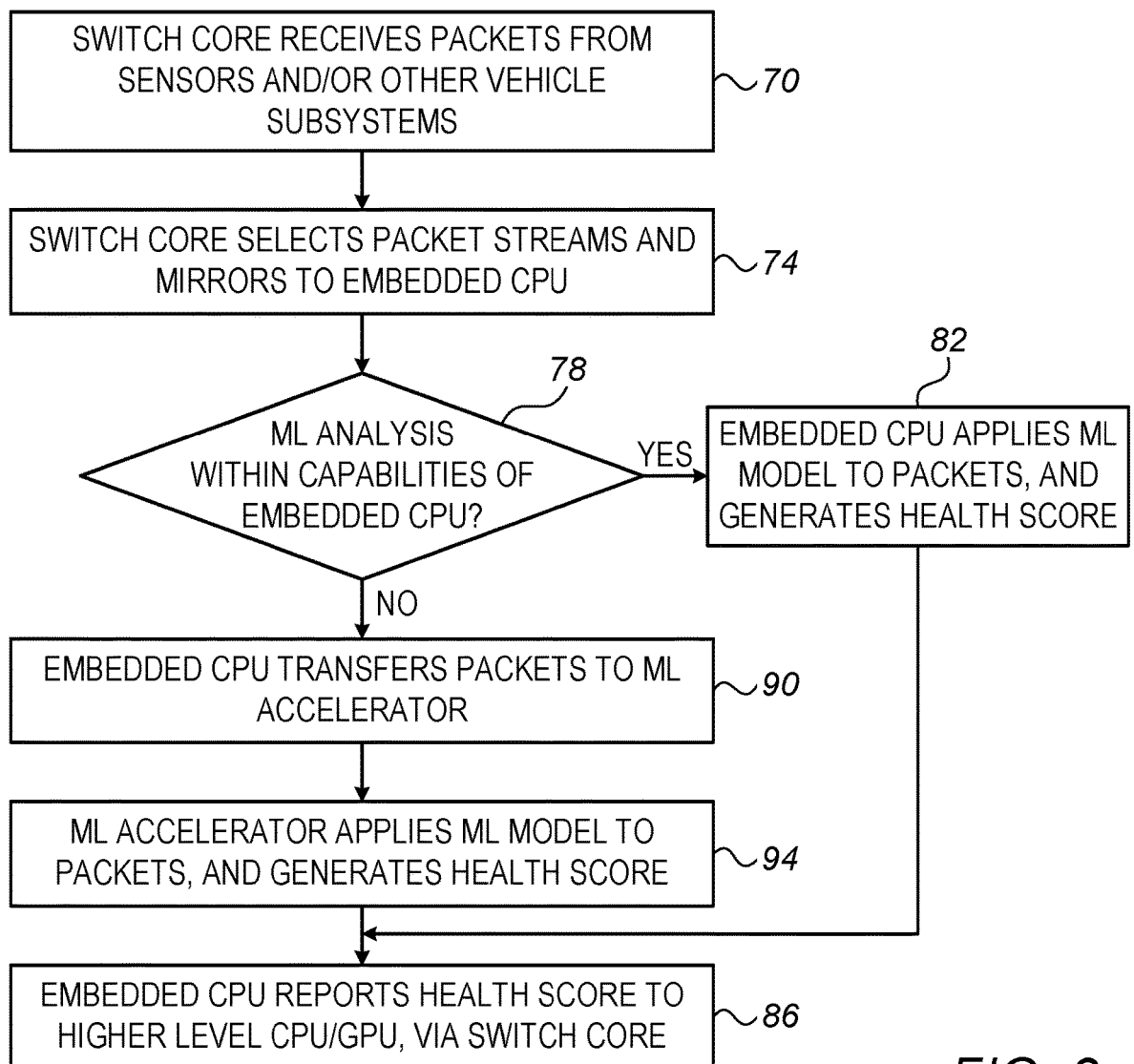
FIG. 2 is a diagram that schematically illustrates collection of packet-related events per port in a network switch, in accordance with an embodiment that is described herein.
FIG. 3 is a flow chart that schematically illustrates a method for anomaly detection using Machine Learning (ML) in a network switch of the communication system of FIG. 1, in accordance with an embodiment that is described herein.

FIG. 2 is a diagram that schematically illustrates collection of packet-related events per port in network switch 32, in accordance with an embodiment that is described herein. In the present example, embedded controller 54 maintains suitable registers that count occurrences of the following events, per port 48 of switch 32:

InDiscards—A count of received frames that were good but could not be forwarded due to lack of buffer memory.

InFiltered—A count of received frames that were good but were not forwarded due to filtering policy rules.

InAccepted—A count of received frames that were good and were not policy-filtered not discarded due to errors.

InBadAccepted—A count of received frames that had CRC errors but were not discarded or filtered.

The counters listed above are depicted solely by way of example. Additionally or alternatively, embedded CPU 54 may accumulate any other suitable statistics that is useful for detecting anomalies.

In some cases, an anomaly in a certain packet stream is indicative of a fault in the subsystem that generates the packet stream. For example, an abnormally low packet rate from a camera may indicate a fault in the camera. In other cases, an anomaly in a certain packet stream is indicative of a fault in another component, such as a loose or faulty cable or connector elsewhere in the network. Thus, in the present context, the term "a fault in a subsystem of vehicle 24" refers broadly to any component that might cause anomalies in packets, e.g., subsystems 28, ECUs, cables, connectors and the like.

In some embodiments, ML accelerator 56 runs, in software and/or hardware, a trained ML inference model that identifies anomalies in one or more packets streams. In other embodiments, a ML inference model may run on embedded CPU 54, without a need for an additional accelerator. In yet other embodiments, embedded CPU 54 or other processor may analyze the packets and identify anomalies using any suitable criteria, without a ML model.

FIG. 3 is a flow chart that schematically illustrates a method for anomaly detection using Machine Learning (ML) in network switch 32 of communication system 20, in accordance with an embodiment that is described herein. The method begins with switch core 52 receiving packets from sensors and/or other subsystems 28 of vehicle 24 via ports 48, at a packet reception operation 70.

At a selection & mirroring operation 74, switch core 52 selects one or more relevant packet streams for analysis, and mirrors the packets of the selected packet streams to embedded CPU 54. In some embodiments switch core 52 selects the packet streams for mirroring using a suitable address-based policy or using other packet header fields. For example, switch core 52 may select packets having predefined source addresses, which correspond to respective sensors or other subsystems that have been pre-designated for monitoring. In other embodiments, switch core 52 may perform Deep Packet Inspection (DPI), e.g., examine the packet payloads or headers that are above the Ethernet layers, to select packet streams for mirroring. Further alternatively, switch core 52 may use any other suitable technique or criterion for selecting which packets to transfer to embedded CPU 54.

At a checking operation 78, embedded controller 54 checks whether the required ML analysis is within its own processing capabilities, or whether the ML analysis requires the use of ML accelerator 56. As noted above, in some cases the required ML analysis uses a simple model that can run on embedded controller 56. In such a case, at a CPU analysis operation 82, embedded CPU 54 applies the required ML model to the packets, so as to identify an existing or imminent fault.

In some embodiments, when identifying a fault, the model outputs a "health score"—a numerical value that gives a quantitative measure of the severity of the fault. In an example embodiment, a very low health score (e.g., zero) indicates a hard failure, a higher health score indicates a partial fault that degrades performance but is not catastrophic, and a yet higher health score indicates an imminent fault that is expected but did not occur yet. Alternatively, any other suitable way of quantifying the severity of faults can be used.

At a reporting operation 86, embedded CPU 54 reports the health score to higher level CPU/GPU 60, e.g., to zone ECU 40 or to central computer 44. In an embodiment, embedded CPU 54 generates a dedicated Ethernet frame that comprises the health score, and sends the frame to higher level CPU/GPU 60 via switch core 52. Alternatively, embedded CPU 54 may report the health score in any other suitable way.

If, on the other hand, the outcome of operation 78 is that the ML analysis is complex and requires the use of ML accelerator 56, embedded CPU 54 transfers the packet streams provided by switch core 52 to ML accelerator 56, at a transferal operation 90. At an accelerator analysis operation 94, ML accelerator 56 applies a ML model (e.g., a deep-learning model) to the packets, so as to identify an existing or imminent fault. As explained above, in some embodiments, when identifying a fault, the model outputs a health score that gives a quantitative measure of the severity of the fault. ML accelerator 56 sends the health score to embedded CPU 54. Embedded CPU 54 reports the health score to higher level CPU/GPU 60, e.g., to zone ECU 40 or to central computer 44, at reporting operation 86.

In various embodiments, higher level CPU/GPU 60 may perform any suitable action in response to receiving the health score. For example, higher level CPU/GPU 60 may issue a real-time alert if the health score indicates a severe fault, or record the health score in memory for off-line analysis. In some embodiments higher level CPU/GPU 60 may take decisions or initiate responsive actions based on a combination of health scores received from the same switch 32 or from multiple different switches 32.

Although the embodiments described herein mainly address automotive network communication systems, the methods and systems described herein can also be used in other applications, such as in industrial network communication systems that use Ethernet links to collect data from sensors and/or control various devices in an industrial environment, and in smart-home systems that collect data from, and control, home sensors and appliances.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An automotive network switch, comprising:
a plurality of ports, configured to receive packets from electronic subsystems of a vehicle over a computer network deployed in the vehicle, and to transmit the packets to other electronic subsystems of the vehicle over the computer network;
a switch core, configured to receive the packets from one or more of the ports, to forward the packets to at least one of the ports, and to transmit the packets over network links of the computer network; and
one or more processors, configured to:
obtain at least some of the packets processed by the switch core;
analyze the obtained packets to identify an anomaly in one or more of the electronic subsystems of the vehicle;
generate a health score, comprising a value that indicates a severity of the anomaly in a range of severity levels; and
send a notification of the anomaly, including the health score, over the computer network to a central processor that is external to the automotive network switch.

2. The automotive network switch according to claim 1, wherein, in analyzing the obtained packets, the one or more processors are configured to identify an existing anomaly or to predict an imminent anomaly.

3. The automotive network switch according to claim 1, wherein at least one of the electronic subsystem comprises a sensor, wherein the ports are configured to receive at least some of the packets from the sensor, and wherein the one or more processors are configured to identify an abnormal functioning of the sensor.

4. The automotive network switch according to claim 1, wherein the one or more processors are configured to identify the anomaly in response to detecting a statistically-deviant pattern of attributes of the packets.

5. The automotive network switch according to claim 4, wherein the statistically-deviant pattern comprises one or more of:
   a statistically-deviant dropping of packets;
   a statistically-deviant packet rate;
   a statistically-deviant latency; and
   a statistically-deviant inter-packet spacing.

6. The automotive network switch according to claim 1, wherein the one or more processors are configured to run a Machine-Learning model configured to detect the anomaly.

7. The automotive network switch according to claim 1, wherein the one or more processors are configured to count events relating to the packets, and to detect the anomaly based on the counted events.

8. The automotive network switch according to claim 1, wherein at least one of the one or more processors comprises a Machine-Learning (ML) accelerator that is separate from a switch Central Processing Unit (CPU) or switch Graphics Processing Unit (GPU) disposed in the switch.

9. The automotive network switch according to claim 1, wherein the one or more processors are configured to select one or more packet streams from among the packets processed by the switch, in accordance with a predefined selection criterion, and to identify the anomaly by analyzing the packets in the selected packet streams.

10. The automotive network switch according to claim 9, wherein the one or more processors are configured to select the one or more packet streams by performing on one or more of (i) examining one or more header fields of one or more of the packets, and (ii) applying Deep Packet Inspection (DPI) to one or more of the packets.

11. The automotive network switch according to claim 1, wherein the health score comprises a numerical value that quantifies the severity of the anomaly.

12. A method for anomaly detection in a vehicle, the method comprising:
   in an automotive network switch in the vehicle, receiving packets from electronic subsystems of the vehicle over a computer network deployed in the vehicle, and transmitting the packets to other electronic subsystems of the vehicle over the computer network;
   analyzing, by the automotive network switch, at least some of the packets processed by the automotive network switch to identify an anomaly in one or more of the electronic subsystems of the vehicle;
   generating a health score, comprising a value that indicates a severity of the anomaly in a range of severity levels; and
   sending from the automotive network switch a notification of the anomaly, including the health score, over the computer network to a central processor that is external to the automotive network switch.

13. The method according to claim 12, wherein analyzing the packets comprises identifying an existing anomaly or predicting an imminent anomaly.

14. The method according to claim 12, wherein receiving the packets comprises receiving at least some of the packets from a sensor, and wherein analyzing the packets comprises identifying an abnormal functioning of the sensor.

15. The method according to claim 12, wherein analyzing the packets comprises identifying the anomaly in response to detecting a statistically-deviant pattern of attributes of the packets.

16. The method according to claim 12, wherein analyzing the packets comprises running a Machine-Learning model configured to detect the anomaly.

17. The method according to claim 12, wherein analyzing the packets comprises counting events relating to the packets, and detecting the anomaly based on the counted events.

18. The method according to claim 12, wherein analyzing the packets is performed, at least partially, by a Machine-Learning (ML) accelerator that is separate from a switch Central Processing Unit (CPU) or switch Graphics Processing Unit (GPU) disposed in the switch.

19. The method according to claim 12, wherein analyzing the packets comprises selecting one or more packet streams from among the packets processed by the switch, in accordance with a predefined selection criterion, and identifying the anomaly by analyzing the packets in the selected packet streams.

20. The method according to claim 12, wherein the health score comprises a numerical value that quantifies the severity of the anomaly.

* * * * *